Patented Aug. 7, 1951

2,562,883

UNITED STATES PATENT OFFICE 2,562,883

CHLORINATION OF CARBOHYDRATE ESTERS

Harold N. Barham, Manhattan, Kans., assignor to Sharples Chemicals Inc., a corporation of Delaware No Drawing. Application September 2, 1948, Serial No. 47,535

19 Claims. (Cl. 260—227)

This invention pertains generally to the chlorination of carbohydrate esters. It pertains more particularly to a process for the chlorination of esters of cellulose, of starch, and of the sugars, irrespective of carbon content, and to new chlorinated carbohydrate ester products, that is, chlorinated carbohydrate ester products in which the chlorine is chemically bound to the carbohydrate ester.

Examples of carbohydrate esters to which my invention pertains are the saturated fatty acid esters of cellulose, such as cellulose formate, acetate, propionate, butyrate, amylate, and mixed esters, for example, cellulose acetate-butyrate, etc.; corresponding esters of starch, such as, starch acetate; corresponding esters of sucrose, such as, sucrose acetate; and corresponding esters of glucose, such as glucose acetate; and similar carbohydrate esters. Esters of sugars generally may be employed, that is esters of sugars other than sucrose and glucose, for example, of maltose, fructose and xylose. It will be understood that the carbohydrate ester molecule may have one or more acyl groups attached, such as may be obtained, for example, by the esterification of up to three hydroxyl groups on the glucoside units of cellulose or starch, but that all of the hydroxyl groups in any case need not be esterified. Thus cellulose esters and starch esters may have an average of only one (or less) hydroxy group per glucoside unit esterified or any other numerical average up to three. In the case of sucrose and glucose, neither of which, incidentally, exists in forms having different molecular weights such as is the case with cellulose and starch, one or more of the hydroxyl groups may be esterified; in the case of sucrose and maltose up to eight; in the case of glucose and fructose up to five; and in the case of xylose up to four.

As examples of such different degress of esterification may be mentioned cellulose monoacetate, cellulose diacetate, cellulose triacetate, starch monoacetate, starch diacetate, starch triacetate, sucrose monoacetate to sucrose octaacetate, glucose monoacetate to glucose pentaacetate, maltose monoacetate to maltose octaacetate, fructose monoacetate to fructose pentaacetate, xylose monoacetate to xylose tetraacetate, and the corresponding propionates, butyrates and amylates.

It will be understood that for practicable purposes, the degree of esterification as expressed above represents an average figure for the number of ester groups present in the molecule or glucoside unit. This follows from the fact that practicable methods of preparation of carbohydrate esters tend to result in the formation of some units which contain a greater number of ester radicals than is represented by the average for the total product and, likewise, some which contain less than the average number. For example, cellulose acetate available from a large commercial source contains an average of from 2.2 to 2.6 acetyl groups attached to each glucoside unit. This means that some glucoside units contain 2 acetyl groups or less while others contain 3 acetyl groups. This statistical distribution of ester groups within the molecule or product taken as a whole is also characteristic of other carbohydrate esters falling within the scope of this invention.

Esters derived from cellulose and starch may vary considerably not only in respect to the number and size of the acyl groups present but also in respect to the average size of the molecules taken as a whole. Cellulose esters having a relatively long molecular chain are characterized, as is well known, by a relatively high viscosity, and those of somewhat shorter chain length are characterized by lower viscosities. Similarly starch esters exist in the form of high molecular weight molecules, the average molecular weights of which differ considerably depending upon the source of the starch itself, and, to some extent, upon its subsequent treatment. My chlorination process is applicable to starch esters and cellulose esters of all ranges of molecular magnitude.

Insofar as I am aware there is no known process whereby chlorinated derivatives of carbohydrate esters have been obtained by reaction of the carbohydrate ester with elemental chlorine maintained in liquid phase. Certain chlorine-containing derivatives of carbohydrate esters, however, have been reported, but are obtained through entirely different chemical processes, and without the outstanding advantages present in my invention.

In the practice of my invention, chlorine in liquid phase is employed as the reagent, and the carbohydrate ester to be treated to produce the desired product is immersed in the liquid chlorine. Thus in the practice of the invention it is preferred that the carbohydrate esters be completely covered with liquid chlorine, since any carbohydrate ester extending above the liquid will be subjected to a vapor phase treatment resulting in products different in character.

Any means known in the art may be employed for maintaining the chlorine in liquid phase, such as self-induced pressure in a closed container, for example, an autoclave. Thus as long as the chlorine employed for chlorination purposes is maintained in the liquid phase, the super-atmospheric pressure in the zone of reaction may be at any desired level.

For convenience, I shall describe my invention more particularly in connection with the chlorination of cellulose esters, such as cellulose acetate, it being understood that similar procedures are applicable to carbohydrate esters generally. Conditions of reaction, such as temperature and time, for optimum results in obtaining the degree of chlorination desired with minimum by-product formation, may vary somewhat with the carbohydrate ester undergoing treatment, but may be readily ascertained by the person skilled in the art upon becoming familiar herewith.

In the practice of my invention, carbohydrate ester, such as, cellulose acetate, for example, is immersed in liquid chlorine, such as in an autoclave. The actual size of the carbohydrate ester sample is, of course, determined by the size and shape of the autoclave as is the amount of liquid chlorine required to immerse, or in other words, completely cover the carbohydrate ester, as is preferred for the reasons above set forth.

While it is usually preferred to treat carbohydrate ester in a relatively pure and dry state, it is to be understood that impure carbohydrate ester, that is, carbohydrate ester in a partially purified state, may likewise be treated in the production of chlorinated carbohydrate ester products more or less contaminated with impurities due to the impurities present in the carbohydrate ester subjected to treatment. While substantially anhydrous carbohydrate ester, for example, ester containing less than 2% water, is frequently preferred, moisture-containing carbohydrate ester may also be treated, for example, carbohydrate ester containing up to 5% or, in some instances up to 20% water by weight. Excessive amounts of water in the zone of reaction tends to bring about hydrolysis of the ester groups present, i. e. de-esterification.

While any suitable temperature may be maintained in the reaction zone after the reactants have been combined, I usually prefer, for example, in the chlorination of cellulose esters, such as cellulose acetate, to employ temperatures between 30° C. and 120° C., and more particularly between 40° C. and 110° C. Generally speaking, in order that the reaction may proceed at a reasonable rate the temperature should be sufficiently high for this purpose, and in order to avoid the production of excessive quantities of undesirable by-products the temperature should be maintained below the point at which excessive amounts of undesirable by-products are produced, such as by destructive decomposition. For higher degrees of chlorination, higher temperatures are recommended. Thus in the case of the chlorination of cellulose triacetate to introduce three, six and nine chlorine atoms, respectively, within a period of around eight hours, temperatures of 50° C., 75° C., and 100° C., respectively, are recommended. It will be understood, of course, that the actual time required may vary somewhat with the particular cellulose triacetate undergoing treatment.

Thus, the time of the reaction will obviously vary with the temperature, the reactivity of the carbohydrate ester under treatment, and the degree of chlorination desired.

At the time of combining the reactants, I prefer, for purposes of insuring control of the reaction, to use temperatures in the reaction zone substantially below those at which the reaction itself is preferably conducted. Thus any danger of spontaneous and uncontrollable reaction may be avoided or reduced by initially cooling the reaction zone prior to the initial combining of the reactants therein to below 0° C., such as below −10° C. or −15° C., and maintaining such temperatures while the reactants are being initially combined. Pre-cooling of the chlorine to any desired degree below room temperature, such as below 10° C. or 0° C., will assist in maintaining such initial combining temperatures. It is also preferable in bringing the reaction mixture to the reaction temperature to apply heat gradually, thus bringing about a relatively gradual increase in the temperature of the reactants. For example, increasing the temperature in the reaction zone at a rate below 1° C. per minute, such as below 0.5° C. per minute, and more particularly below 0.25 C. per minute, is satisfactory, although more rapid heating may be employed if suitable means of control are available. After initial combination of chlorine with the carbohydrate ester has occurred, as evidenced by formation of hydrogen chloride, the temperature may suitably be elevated, such as above set forth.

While the process may be carried out by operating batchwise, it lends itself to other types of treatment, such as, batch counter-current, or a treating procedure wherein liquid chlorine is made to flow through a body of carbohydrate ester under treatment with recycling of the liquid chlorine, if desired, such as after the removal of HCl therefrom.

Since chlorine under the temperature of treatment has a substantial vapor pressure, chlorine is present in the vessel in both the liquid and vapor phases unless, of course, the vessel is completely filled with liquid.

In the case of impure carbohydrate ester, the impurities may be separated prior to treatment to any desired extent, or the chlorinated carbohydrate ester products may be purified to any desired extent after their production in accordance with my invention.

In the chlorination of carbohydrate ester in accordance with my invention a variety of products may be obtained depending both upon the nature of the carbohydrate ester under treatment and upon the extent to which the chlorination is carried. In the event that the carbohydrate ester is completely esterified, thus containing no free hydroxyl groups, the chlorination is entirely a process of substitution of hydrogen atoms. The available hydrogen atoms on the alkyl groups may be substituted with chlorine atoms to a greater or lesser extent depending upon conditions employed; likewise the hydrogen atoms on the nuclear carbon atoms may be replaced by chlorine. On the other hand, when the carbohydrate ester under treatment is incompletely esterified, thus having hydroxyl groups present, both substitutive chlorination and oxidative chlorination may occur. Oxidation is believed to take place by removal of hydrogen atoms from the hydroxyl group and from the carbon atom to which the hydroxyl group is attached, with elimination of HCl and formation of carbonyl groups.

By suitable control of reaction conditions, however, such as temperature and time, chlorination may be largely confined to the alkyl group of the acyl radical. In the case of cellulose triacetate, for example, there are present 9 hydrogen atoms in the 3 acetyl groups, which may be replaced by chlorine. Thus, depending upon the extent to which the reaction is carried, cellulose chloroacetate products may be obtained having 1, 2, 3 and up to 9 chlorine atoms per glucoside unit. Since, moreover, we are dealing with average chlorine contents the average number of chlorine atoms per glucoside unit in such chloroacetate products may have any value from 0 to 9. If the chlorination reaction is conducted under conditions leading also to substitution and oxidation in the ring itself, products thus derived will in general be somewhat less stable than those in which chlorination is confined largely to the acyl group.

Usually when the chlorination is continued until substantially all the hydrogens in the acyl groups are substituted, some ring chlorination will occur. Thus treatment of cellulose triacetate for 48 hours at 50° C. gave a product containing 57.0% chlorine, this corresponding to an average of 10.36 chlorine atoms per glucoside unit. Useful chlorinated cellulose triacetates may readily be prepared in which from 1 to 16 chlorine atoms are present per glucoside unit.

The maximum amount of chlorine which may be introduced into the carbohydrate ester will depend somewhat on the number of available hydrogen atoms, and will thus be greater, for example, in the case of cellulose triacetate than in the case, for example, of cellulose monoacetate. Similarly more chlorine may be combined when the carbohydrate ester contains acyl constituents of larger size as compared with those containing such constituents of smaller size.

Any desired degree of chlorination may be obtained by the simple expedient of cooling the reaction mixture to room temperature or below when the chlorine content of the product has reached the desired level.

In order to guard against possible undue destructive decomposition of the carbohydrate ester, I prefer to maintain the hydrogen chloride concentration in the liquid chlorine phase at as low a value as is feasible throughout the course of the reaction, and particularly during the initial stage of the chlorination. Any desired means may be employed for this purpose, such as, the use of an initially large excess of chlorine, the addition of further chlorine as the reaction progresses, the progressive removal of hydrogen chloride, or any combination thereof, or otherwise. In most instances it is sufficient to maintain a molecular ratio of chlorine to hydrogen chloride in the zone of reaction, that is in the liquid phase, in excess of approximately 6:1 prior to the time when the product contains an average of about one atom of chlorine per sugar ring. Although subsequently the ratio of chlorine:HCl, i. e. the concentration of HCl in the liquid phase, may be somewhat higher, excessive concentrations even then are preferably avoided. It will be understood, however, that the minimum ratio of chlorine to hydrogen chloride for satisfactory reaction will depend to some extent on the nature of the carbohydrate ester undergoing treatment, the degree of esterification and the reaction temperature. In general carbohydrate esters containing non-esterified hydroxyls are more susceptible to degradation by HCl than are the more completely esterified materials.

While I prefer to employ substantially undiluted liquid chlorine in my process, (except for such HCl and water, if present, as dissolves therein in the practice of the process), it is to be understood that a solvent for the chlorine or a non-solvent diluent may be present, particularly if such solvent or diluent is inert in the sphere of the reaction. Thus chlorine in solution might be employed, such as for example, a solution of chlorine in a non-polar solvent such as in carbon tetrachloride or in any other suitable solvent which is inert under the conditions obtaining in the chlorination reaction. The concentration of chlorine in any such solution preferably should be at least 50%, and more preferably at least 75%, such as, at least 90% by weight.

For effective chlorination of the carbohydrate ester charged to the process, the state of subdivision of the carbohydrate ester should preferably be such as to permit the chlorine to intimately contact the same for reaction purposes as will be understood.

As pointed out above, after the carbohydrate ester and liquid chlorine are charged to the process, which, for convenience, is usually at temperatures at or below 0° C., it is preferred that the charge be brought up to temperature for chlorination purposes slowly in order to control the rate of reaction and the rate of heat evolution.

The reaction is believed to occur, for the most part, in the liquid phase. Initially the carbohydrate ester may be partially in undissolved form, (unless initially dissolved in a solvent) but, as the reaction progresses, it becomes more soluble, in most cases with the ultimate formation of a homogeneous or near homogeneous solution. The products are frequently solids at room temperature varying in color. In most instances they are stable at ordinary temperatures and frequently at temperatures as high as 100° C. or higher.

In the case of cellulose triacetate the products obtained are white powders, soluble in chloroform, liquid chlorine, benzene, acetone, and insoluble in petroleum ether and water. They are capable of forming transparent water repellant films from benzene or chloroform solutions. The products decompose without melting into a sintered charry mass. Their density increases with chlorine content, and those containing a substantial proportion of chlorine wil burn when held in a Bunsen flame but will not support combustion when removed from the flame. They show specific adsorption on cellulose, and impart waterproof properties to cellulosic materials.

Chlorinated carbohydrate esters may be used as chemical intermediates, particularly in the manufacture of resins and plastics. Many have value as constituents in film forming compositions such as are employed in the coating, sizing or preserving of paper, the water-proofing of textiles, and for other purposes.

The following specific examples ilustrate the practice of my invention, and may be adapted to the production of chlorinated carbohydrate esters generally:

Example 1

A sample of dry, high viscosity cellulose triacetate weighing 28.825 grams was placed in a 1600 ml. autoclave epuipped with a rocking mechanism. The whole assembly was then cooled to −23° C. after which 450 grams of liquid chlorine was introduced. The autoclave and contents were allowed to warm up gradually to room temperature was then increased at a rate of about 0.22° per minute until a temperature of 110° C. was attained, whereupon the autoclave and the reaction mixture was cooled to room temperature.

The gaseous constituents were vented at atmospheric pressure through water scrubbers designed to recover the HCl formed during the reaction. The residual product was further freed of gases by application of vacuum and moderate heating. After purification by precipitation with petroleum ether from its chloroform solution, it was freed of solvent by drying under vacuum at room temperature. Chemical analysis showed that it consisted essentially of tri-trichloroacetyl cellulose.

Example 2

A sample of starch triacetate weighing 0.7899 gram was placed in a Carius bomb tube. The tube and contents were then cooled to −76° C. in an alcohol-Dry Ice bath after which 12 ml. of chlorine were introduced in liquid form. The tube was sealed and was immersed in a water bath, thermostatically controlled at 50° C., and was maintained at that temperature without shaking or agitation for 48 hours. The tube was then again cooled to −76° C., was opened, and the gases present were eliminated through scrubbers for recovery of hydrogen chloride. The residual product was obtained as a nearly colorless brittle film, and amounted to 1.331 grams. It contained 44.55% chlorine by weight corresponding to 6.08 chlorine atoms per glucoside unit.

Example 3

Substantially by the procedure of Example 2, 0.7848 gram of cellulose triacetate was treated with liquid chlorine. In this instance it was observed that the cellulose triacetate became completely dissolved in the chlorine after approximately 2 hours. Gas was steadily evolved throughout the reaction. The product as finally obtained was a clear, slightly yellow, brittle solid amounting to 1.758 grams. It contained 57.00% chlorine, corresponding to 10.36 chlorine atoms per glucoside unit. 10.84 mols of HCl were formed per glucoside unit, indicating relatively little oxidation or chlorolysis of connecting ether linkages. The product could be deposited as a transparent film from benzene solution.

Example 4

Cellulose triacetate was chlorinated in the autoclave of Example 1 at a temperature of 40° C. maintained for a period of 48 hours. The relative amounts of cellulose triacetate and liquid chlorine were sufficient to keep the former completely immersed. The product thus obtained, after elimination of volatile materials, contained 21.62% by weight of chlorine.

Example 5

By the procedure of Example 4, with the exception that the temperature employed was 70° C. and the time was 24 hours, a chlorinated cellulose triacetate was obtained which was found to contain 34.20% by weight of chlorine.

Example 6

Repetition of the procedure of Example 4 but at a temperature of 90° C. and reaction time of 2 hours gave a product containing 28.00% by weight of chlorine.

While in the foregoing specific examples a catalyst was not present, it is to be understood that my invention contemplates the presence of a suitable catalyst, if desired, to speed up the reaction, or to cause the reaction to take place at a reasonable rate at a lower temperature, or otherwise.

Furthermore, while the invention has been described more particularly in connection with the chlorination of carbohydrate esters as such, it is to be understood that it may be applied to the chlorination of substituted carbohydrate esters.

It will be understood that the above particular description is by way of illustration, and that changes, omissions, additions, substitutions and/or modifications may be made by persons skilled in the art, without departing from the spirit of the invention, which is intended to be limited only by the scope of the claims.

I claim:

1. A process for the chlorination of carbohydrate esters, comprising maintaining an acyl ester of a carbohydrate immersed in liquid chlorine under super-atmospheric pressure until the chemically combined chlorine content of the carbohydrate ester reaches an average of at least approximately one chlorine atom per glucoside unit.

2. A process for the chlorination of a saturated carboxylic acid ester of a carbohydrate in which each acyl group contains from one to five carbon atoms, comprising maintaining said carbohydrate ester immersed in liquid chlorine under super-atmospheric pressure until the chemically combined chlorine content of the carbohydrate ester reaches an average of at least approximately one chlorine atom per glucoside unit.

3. A process for the chlorination of cellulose ester, comprising maintaining an acyl ester of cellulose immersed in liquid chlorine under super-atmospheric pressure until the chemically combined chlorine content of the cellulose ester reaches an average of at least approximately one chlorine atom per glucoside unit.

4. A process for the chlorination of cellulose acetate, comprising maintaining cellulose acetate immersed in liquid chlorine under super-atmospheric pressure until the chemically combined chlorine content of the cellulose acetate reaches at least approximately three chlorine atoms per glucoside unit.

5. A process for the chlorination of cellulose triacetate, comprising maintaining cellulose triacetate immersed in liquid chlorine under super-atmospheric pressure until the chemically combined chlorine content of the cellulose triacetate reaches a value from one to nine chlorine atoms per glucoside unit.

6. A process for the chlorination of cellulose ester, comprising maintaining a saturated carboxylic acid ester of cellulose immersed in liquid chlorine at a temperature between 30° and 120° C. until chemical combination between the cellulose ester and chlorine has occurred, resulting in evolution of hydrogen chloride, and maintaining in the zone of the reaction a molecular ratio of chlorine to hydrogen chloride of at least about 6:1 when the amount of combined chlorine in the cellulose ester is less than corresponds to an average of one chlorine atom per glucose ring.

7. The process of claim 1, but in which the reaction is carried out under substantially anhydrous conditions.

8. The process of claim 1, but in which the reaction is carried out in the presence of not more than 20% of water based on the weight of carbohydrate ester.

9. A chlorinated acyl ester of a carbohydrate having ring attached chlorine.

10. A chlorinated acyl ester of cellulose having ring attached chlorine.

11. Chlorinated cellulose acetate containing an average of at least one ring attached chlorine atom per glucoside unit.

12. Chlorinated cellulose triacetate containing an average in excess of nine and not greater than sixteen chlorine atoms per glucoside unit.

13. A chlorinated cellulose acetate having an average of from one to three acetyl groups per glucoside unit and containing ring attached chlorine.

14. The process of claim 3 in which the cellulose ester is cellulose acetate.

15. The process of claim 3 in which the cellulose ester is cellulose acetate containing an average of between one and three acetyl groups per glucoside unit.

16. The process of claim 1 in which the reactants are initially combined at a temperature below 0° C.

17. The process of claim 16 in which the temperature is increased, after initial combining of the reactants, at a rate not exceeding 1° C. per minute, and in which the final temperature does not exceed 120° C.

18. A process for the chlorination of starch ester, comprising maintaining a saturated carboxylic acid ester of starch immersed in liquid chlorine under super-atmospheric pressure until the chemically combined chlorine content of the starch ester reaches an average of at least approximately one chlorine atom per glucoside unit.

19. A process for the chlorination of sugar ester, comprising maintaining a saturated carboxylic acid ester of sugar immersed in liquid chlorine under super-atmospheric pressure until the chemically combined chlorine content of the sugar ester reaches an average of at least approximately one chlorine atom per sugar ring.

HAROLD N. BARHAM.

REFERENCES CITED

The following references are of record in the file of this patent:

UNITED STATES PATENTS

| Number | Name | Date |
|---|---|---|
| 1,347,801 | Zdanowich | July 27, 1920 |
| 1,874,350 | Reid | Aug. 30, 1932 |
| 1,946,645 | Staud et al. | Feb. 13, 1934 |
| 2,073,052 | Dreyfus | Mar. 9, 1937 |
| 2,489,225 | Morris et al. | Nov. 22, 1949 |

FOREIGN PATENTS

| Number | Country | Date |
|---|---|---|
| 471,847 | Great Britain | Sept. 13, 1937 |

OTHER REFERENCES

Marsh et al.: "Chemistry of Cellulose," 1938, pp. 214–217.